Patented May 3, 1927.

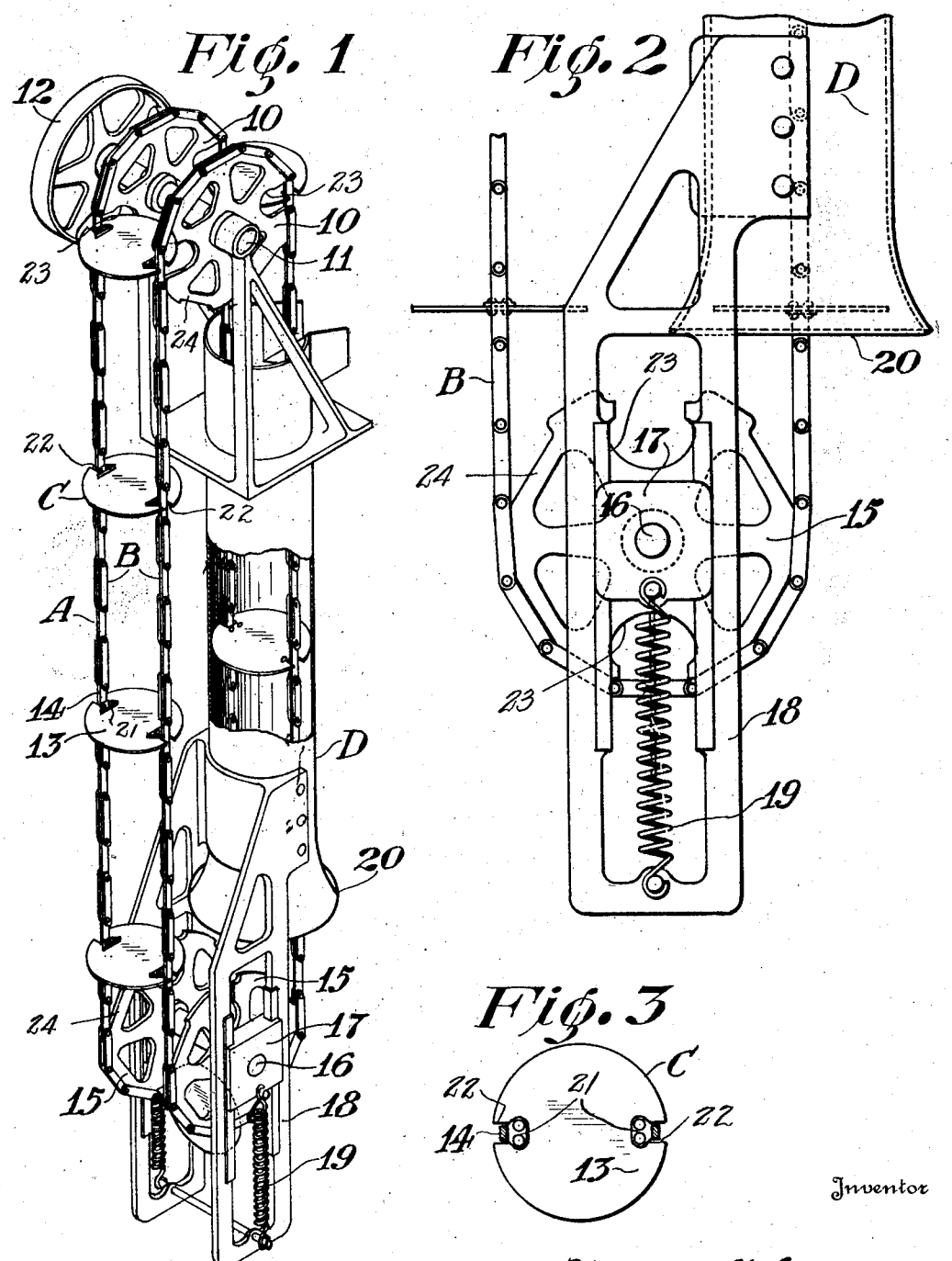

1,626,812

UNITED STATES PATENT OFFICE.

WILLIAM F. GODFREY, OF KEARNEY, NEBRASKA.

ENDLESS-CHAIN PUMP.

Application filed November 22, 1926. Serial No. 149,902.

This invention relates to improvements in endless chain pumps, and has for its object to provide such a pump that shall be free from vibration when in use, easily operated and free from slack in the chains thereof.

With the above and other objects in view, my invention consists in the combination and arrangement of parts hereinafter described and claimed, it being understood that, within the scope of what is claimed, changes in the precise embodiment shown, may be made without departing from the spirit of the invention.

In the drawings

Figure 1 is a perspective elevation, partly in section, of my invention;

Figure 2 is an enlarged side elevation of the lower part of my invention;

Figure 3 is a detail of one of the buckets.

Endless chain pumps, as is well known to those skilled in the art, usually comprise an endless traveling chain of buckets hanging in parallel vertical plies from an upper driving sprocket and engaging a bottom idler sprocket near the bottom of the body of water so that one vertical ply of the chain is constantly descending through a more or less great depth of water, while the other vertical ply is ascending and lifting water through a vertical trough or casing to the discharge for the water elevated. This casing extends from the said discharge above the maximum water level down through the water and is open at its lower end usually near the bottom to form the pump inlet through which the buckets pass inwardly in succession.

In the use of such a pump, several objectionable features arise, of which one is the chattering or vibration of the buckets ascending in the casing due to the fact that the supporting element thereof comprises only one chain and the buckets may therefore tip slightly in any direction about said chain, thus giving rise to the aforesaid vibration. Another objectionable feature is the fact that the said chain lengthens as it wears, so that in course of time it becomes loose, further aggravating the aforesaid vibration. Another objectionable feature is that the buckets in entering the said casing are apt to be caught on the lips thereof, thus causing a loss of power and aggravating the aforesaid vibration. Finally, the vibration itself is a cause of loss of power and reduces the efficiency of the pump.

With the object of overcoming the aforesaid objectionable features, I provide an improved form of construction as shown on the accompanying drawings, wherein A refers to an endless flexible conveyor or elevator, comprising in my preferred form a double run of sprocket chains B, having mounted thereon the uniformly spaced buckets C, the said chains B being adapted to pass over the sprocket wheels 10 mounted on the drive shaft 11 driven by any suitable means such as the pulley 12.

The said buckets C comprise the circular flights 13 attached to the supporting links 14 as by ears 21 formed on said links 14, the said ears in the drawing, for the sake of clearness, being shown on one side only of the flights 13, but obviously the said ears 21 may be formed so as to entirely close over the slots 22 by means of which the said links 14 are adapted to be inset into the said flights so that the said circular flights 13 are adapted by their shape to pass through the pump casing D, the said pump casing D comprising also a framework for the said pump and a supporting element for the said chains.

The said supporting links 14 are attached to and inset into the flights 13 diametrically opposite each other, thus providing two points of support for each flight so that the said buckets C are thereby restrained from vibration in the plane of said supporting links 14, and vibration considerably diminished in other directions by reason of the tautness of the said chains B as will now be described.

The lower portions of the said chains B pass over the sprocket wheels 15 mounted on the shaft 16 journaled in the blocks 17 slidably positioned in the dependent ways 18 of the casing D. Affixed to the blocks 17 are the springs 19, the other end of the said springs 19 being affixed to the lower end of the ways 18. The above described structure by virtue of the springs 19 acting downwardly through the blocks 17 and shaft 16, communicates a tension to the chains B, whereby said chains B are always kept taut and slackness of the chains B due to wear or other causes thereby prevented.

The lower end of the casing D is formed with a bell shaped portion as shown at 20, whereby the entrance of the buckets C into the casing D is greatly facilitated and at the same time the said buckets are prevented from catching on or otherwise fouling the lips of the said casing D.

The sprocket wheels 10 and 15 are formed in the conventional manner except that a plurality of pockets, as at 23, are formed in the rims 24 of said wheels, wherein portions of the said flights 13 are adapted to be positioned when passing over the wheels aforesaid so as to thereby be prevented from fouling the said wheels, as shown in Figure 2, one of the said flight 13 being shown directly behind the spring 19 in this case, and positioned in one of the pockets of the sprocket wheel 15, also as shown in Figure 1 wherein one of the flights is shown in the sprocket wheel 10.

In use, the drive shaft 11 being caused to rotate by any suitable means as by power applied to the pulley 12, the consequent rotation of the sprocket wheels 10 causes the chains B to pass thereover, thus lifting the one run of flights 13 through the casing D and lowering the other run of flights so as to pass around the sprocket wheels 15. As the flights 13 approach the sprocket wheels 10 and 15, the relationship between the position of the said flights on the chain and the pockets 23 in the rims of the sprocket wheels is such that such portions of the said flights as would interfere with the said sprocket wheels will be positioned in the said pockets while passing over the sprocket wheels.

I claim:

1. The combination, in a chain pump having a driven endless connection and a series of water lifting buckets, of a plurality of said endless connections attached to and diametrically inset into said buckets substantially so as to form a plurality of supports for said buckets.

2. The combination, in a chain pump having an endless series of water lifting buckets and a pump casing in which said buckets travel longitudinally to lift water to the pump discharge from said casing, of a plurality of driven endless connections affixed to said buckets and diametrically inset therein, depending ways affixed to the lower portion of said pump casing, a shaft slidably journaled in said ways, springs affixed to said shaft and to said ways and a plurality of sprockets mounted on said shaft and adapted to receive said plurality of endless connections.

3. The combination, in a chain pump having a driven endless connection, sprocket wheels adapted to engage said endless connection and a series of water lifting buckets, of a plurality of said endless connections attached to and diametrically inset into said buckets substantially so as to form a plurality of supports for said buckets, said sprocket wheels having a plurality of pockets provided therein wherein said buckets are adapted to be positioned while passing over said wheels.

4. The combination, in a chain pump having a plurality of driven endless connections, and sprocket wheels adapted to engage said endless connections, of a series of circular water lifting buckets, said endless connections being attached to and diametrically inset into said buckets, and said sprocket wheels having a plurality of pockets provided in the rims thereof wherein said buckets are adapted to be positioned while passing over said wheels.

5. In combination with a plurality of endless connections, a bucket for a chain pump, comprising a circular disc having diametrically positioned slots in its outer periphery, said endless connections being positioned in said slots.

6. In a chain pump comprising a plurality of endless connections, and sprocket wheels adapted to have said endless connections passed thereover, the combination comprising a bucket comprising a circular disc having diametrically positioned slots in its outer periphery, said endless connections being adapted to be positioned in said slots, said sprocket wheels having pockets in the rims thereof wherein said buckets are adapted to be positioned while passing over said wheels.

In testimony whereof I affix my signature.

WILLIAM F. GODFREY.